United States Patent [19]
Zack et al.

[11] Patent Number: 5,459,828
[45] Date of Patent: Oct. 17, 1995

[54] OPTIMIZED SCALING AND PRODUCTION OF RASTER FONTS FROM CONTOUR MASTER FONTS

[75] Inventors: Gregory W. Zack, Ithaca; William E. Nelson, Penfield, both of N.Y.

[73] Assignee: Xerox Corporation, Stamford, Conn.

[21] Appl. No.: 561,298

[22] Filed: Aug. 1, 1990

[51] Int. Cl.$^6$ .................................................. G06T 11/00
[52] U.S. Cl. .......................... 395/151; 395/110; 395/150
[58] Field of Search ...................................... 395/150, 151, 395/110; 340/731, 735; 345/16–17, 25–26, 127–130, 132, 141–144, 192–195

[56] References Cited

U.S. PATENT DOCUMENTS

| | | | |
|---|---|---|---|
| 4,675,830 | 6/1987 | Hawkins | 364/518 |
| 4,897,638 | 1/1990 | Kokunishi et al. | 345/142 |
| 4,933,866 | 6/1990 | Markoff et al. | 364/518 |
| 4,959,801 | 9/1990 | Apley et al. | 395/150 |
| 5,050,228 | 9/1991 | Yoshida et al. | 382/55 |
| 5,068,905 | 11/1991 | Hackett et al. | 382/47 |
| 5,099,435 | 3/1992 | Collins et al. | 395/150 |
| 5,241,653 | 8/1993 | Collins et al. | 395/139 |

Primary Examiner—Mark K. Zimmerman
Assistant Examiner—J. Feild
Attorney, Agent, or Firm—Mark Costello

[57] ABSTRACT

A method of producing a raster font from a contour font entailing the steps of deriving font metrics and character metrics of font characters in terms of arbitrary font units; scaling the font characters to a selected size and output resolution (pixels per unit length); altering the thickness of vertical and horizontal strokes of each character to a desired thickness, from the measured font metrics and character metrics, and including a difference applied to the thickness of the strokes by the printer process, to cause the strokes to be close to an integer number of pixels and thickness and to compensate for thinning and thickening which the printing engine might produce; bringing the leading and trailing edges of the characters to integer pixel locations, where such locations are based on and scaling the character between the leading and trailing edges proportionally therebetween, and producing a rasterized font from the altered contour font character.

4 Claims, 6 Drawing Sheets

Microfiche Appendix Included (5 Microfiche, 398 Pages)

TRANSFORM

*FIG. 2B*

THICKEN

*FIG. 2C*

SNAP

*FIG. 2D*

(5 Microfiche, 398 Pages)

RASTERIZE

*FIG. 2E*

OPTIMIZED SCALING AND PRODUCTION OF RASTER FONTS FROM CONTOUR MASTER FONTS

APPENDIX

A microfiche Appendix, having 5 fiche and 398 frames, is included herewith.

The present invention relates generally to the production of raster fonts from contour fonts, and more particularly, to a method of producing raster fonts from contour fonts taking into account characteristics of the contour font and the printer system which will ultimately print the font.

COPYRIGHT RESERVATION

A portion of the disclosure of this patent document contains material which is subject to copyright protection. The copyright owner has no objection to the facsimile reproduction by anyone of the patent document or the patent disclosure, as it appears in the Patent and Trademark Office files or records, but otherwise reserves all rights whatsoever.

CROSS REFERENCE

Cross reference is made to U.S. patent application Ser. No. 07/416,211 by S. Marshall, entitled "Rapid Halfbitting Stepper", and assigned to the same assignee as the present invention.

INCORPORATION BY REFERENCE

U.S. Pat. No. 4,675,830 to Hawkins is incorporated herein by reference for the purposes of background information on contour fonts. U.S. patent application Ser. No. 07/416,211 by S. Marshall, entitled "Rapid Halfbitting Stepper", and assigned to the same assignee as the present invention, is incorporated by reference herein for the purposes of teaching rasterization.

BACKGROUND OF THE INVENTION

"Contour fonts" is a term that refers to the use of outlines or contours to describe the shapes of characters used in electronic printing. In a contour font, each character shape is represented by one or more closed curves or paths that traces the boundary of the character. The contour is specified by a series of mathematical equations, which may be in any of several forms, the most common being circular arcs, straight lines, and polynomial expressions. The shape of the contour font is that of the ideal design of the character and, generally, does not depend on parameters associated with any printer. Contour fonts are ideal for use as master representations of typefaces.

Bitmap fonts or raster fonts are composed of the actual characters images that will be printed on a page, and are made by scaling contours to the appropriate size, quantizing or sampling them at the resolution of the printer, and filling the interiors of the characters with black bits or pixels. Achieving high quality in this process is difficult, except at very high resolutions, and requires knowledge of both the marking technology and typographic design considerations. Often, a bitmap font is delivered to a printer. There is a separate bitmap font for each size of a font, and sometimes separate fonts for landscape and portrait orientations.

The advantage of a contour font is that it can be scaled to any size and rotated to any angle by simple mathematics. Therefore, a single font suffices to represent all possible printing sizes and orientation, reducing font storage requirements, reducing the cost of font handling.

The difficulty in this approach is in achieving high quality character images during the sampling process which generates the raster characters from the contour masters. If the contour character is simply sampled, there will be random ±1 pixel variations in stroke thickness. If the printing process tends to erode black areas (common in write-white laser xerography) characters will be consistently too thin. If the printing process tends to fatten black areas (common in write black laser xerography), characters will be too thick.

At the high resolution employed in phototypesetters, usually greater than 1,000 spi, no special techniques are required for scaling and sampling the contour font to generate a raster font of any size. This is because although simple sampling necessarily has random one-bit errors, such errors are small compared to the size of the character, making errors insignificant. At 300, 400, and 600 spi though, character strokes are only three or four bits thick and each bit is important. The simplistic methods used by typesetter manufacturers are not sufficient.

U.S. Pat. No. 4,675,830 to Hawkins, uses defined points in a contour font that must be grid aligned to pixel positions, but the stem widths or edges are not aligned.

Of particular importance in generating fonts of optimal appearance are maintenance of uniform and correct stroke thickness among characters of a font and on different printing engines, uniform alignment of characters on a baseline, and uniform spacing of characters.

SUMMARY OF THE INVENTION

In accordance with the invention, there is provided a method for conversion of contour fonts to bitmap fonts with automatic thickening and thinning of strokes, and snapping of character edges to pixel or half pixel boundaries.

In accordance with the invention, there is provided a method of producing a raster font from a contour font entailing the steps of: first, deriving font metrics and character metrics of font characters in terms of arbitrary font units; scaling the font characters to a selected size and output resolution (pixels per unit length); altering the thickness of vertical and horizontal strokes of each character to a desired thickness, from the measured font metrics and character metrics, and including a difference applied to the thickness of the strokes by the printer process, to cause the strokes to be close to an integer number of pixels and thickness and to compensate for thing and thickening which the printing engine might produce; bringing the leading and trailing edges of the characters to integer pixel locations, where such locations are based on and scaling the character between the leading and trailing edges proportionally therebetween, and producing a rasterized font from the altered contour font character.

These and other aspects of the invention will become apparent from the following description used to illustrate a preferred embodiment of the invention in conjunction with the accompanying drawings in which:

With reference to the drawing, where the showing is for the purpose of illustrating an embodiment of the invention and not for the purpose of limiting same, the Figure shows a block diagram of the present invention which will be referred to and described hereinafter.

Figure 1:
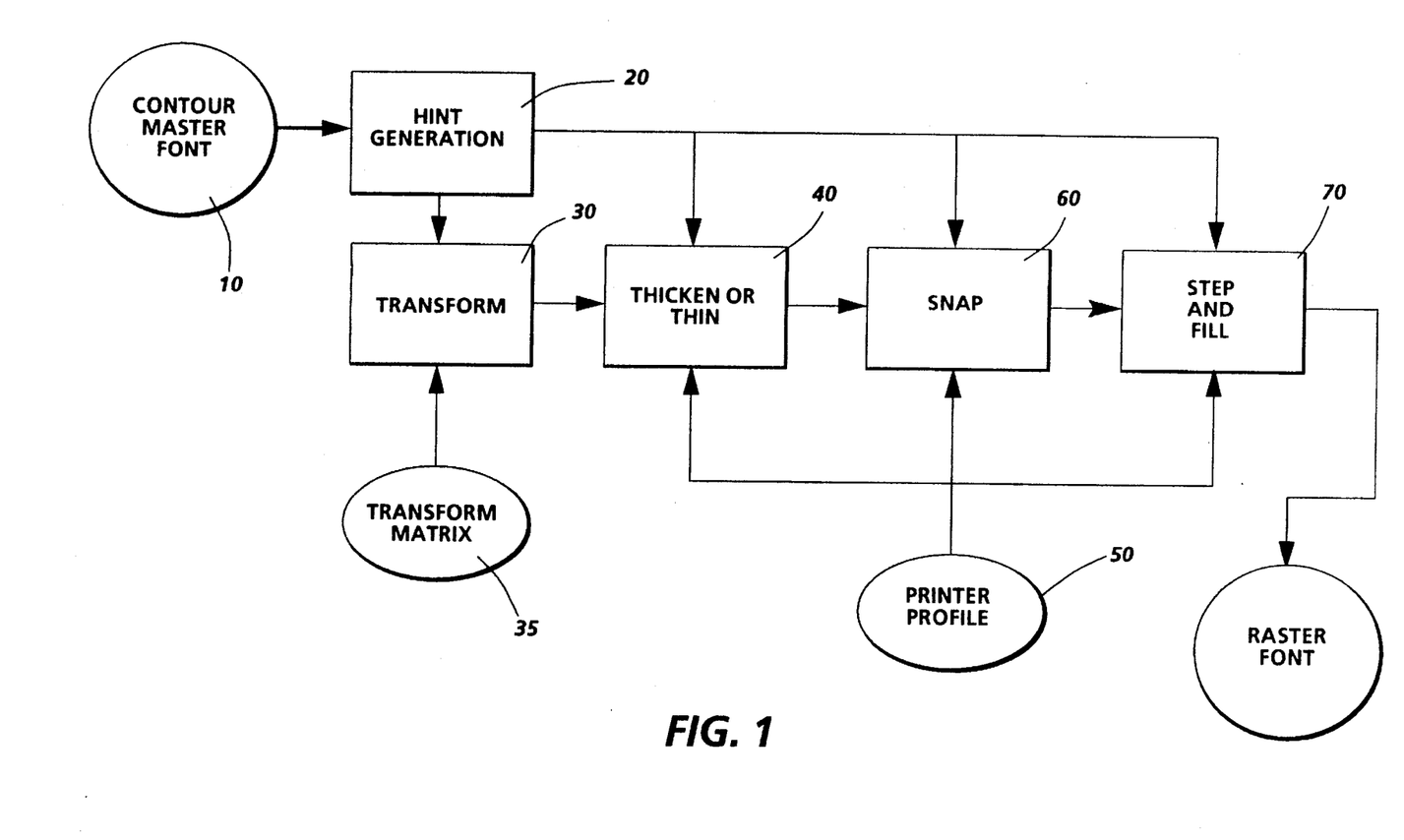
FIG. 1 shows a block diagram of the inventive optimized scaler rasterizer system.
Figure 2A:
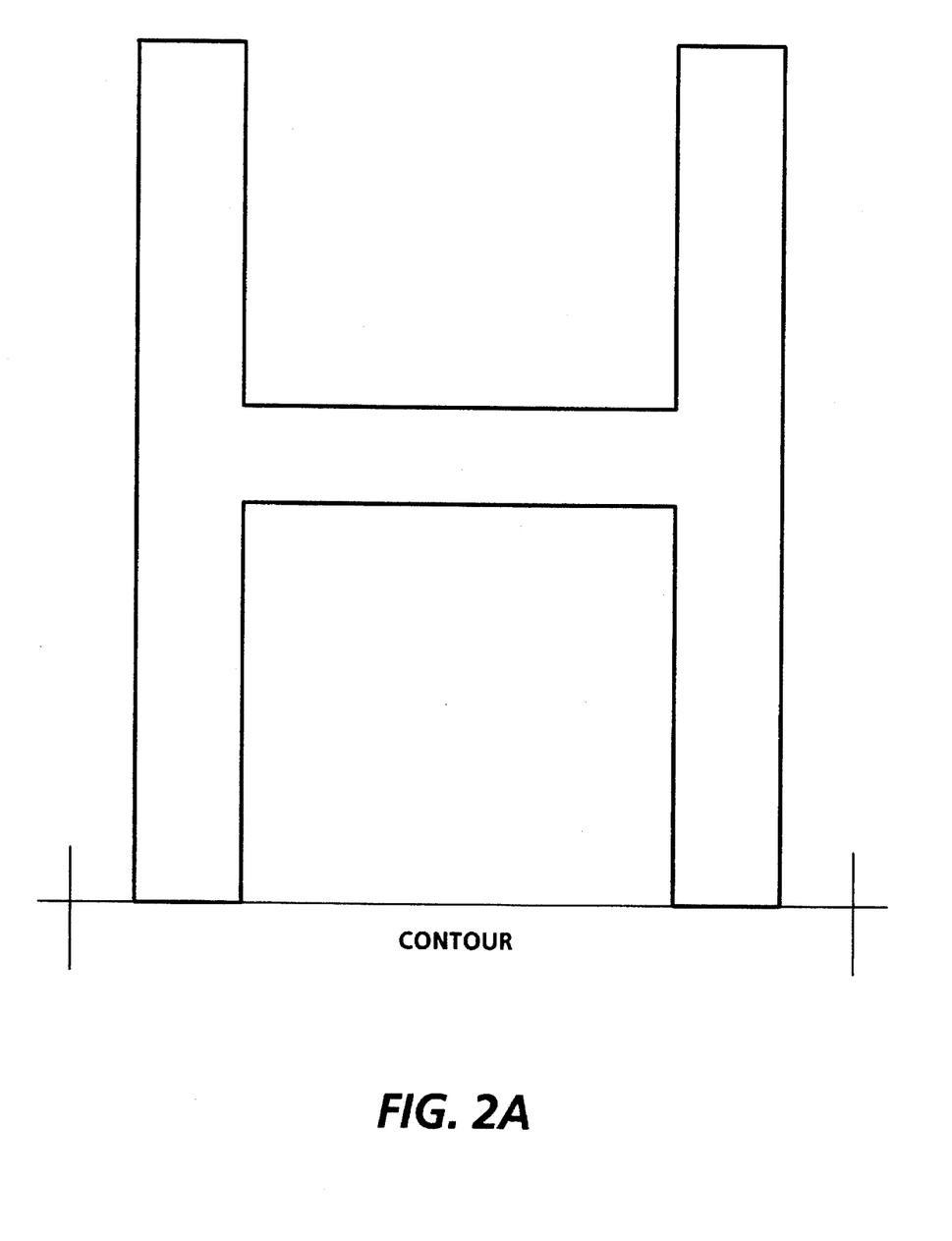
FIGS. 2A–2E illustrate the development of a raster font from a contour font, using the system described in FIG. 1.

FIG. 1 shows a block diagram of the contour rasterization process of the present invention. Beginning with a contour font 10, and with a character "H" shown in contour for illustration purposes at FIG. 2A the contour font is analyzed initially at hint generation step 20. At the hint generation, the parameters defining the font are determined, including measurement of the following metrics and character hints:

TABLE 1

| Font Metric | Comments |
| --- | --- |
| Cap-height | Height of the H, I or similar letter |
| X-Height | Height of the lower case x |
| Ascender | Height of the lower case k, b, or similar letter |
| Descender | Position of the bottom of the lower case p or q |
| Thickness of Upper Case Stems | Vertical stroke thickness on upper case H or K |
| Thickness of Upper Case Cross-Strokes | Horizontal Stroke on upper case E or F |
| Thickness of Lower Case Stems | Vertical stroke thickness on lower case k or l |
| Thickness of Lower Case Cross-Strokes | Horizontal stroke thickness on the f |
| Thickness of Auxiliary Character Stems | |
| Thickness of Auxiliary Character Cross-Strokes | |
| Hairline thickness | Thickness of the cross bar on the e or the thin part of the o |

(See, Appendix, page 13, ICFFontIODefs. Mesa)

Character hints are generated for each character and include the following:

TABLE 2

| Character Metric | Comments |
| --- | --- |
| Position of all horizontal edges and indications of whether each edge is a leading or trailing edge. Position of all vertical edges and indication of whether each edge is a leading or trailing edge. Direction of the normal vector (perpendicular) to the contour at each control point in the contour, pointing toward the white region. | Left sides of strokes are leading edges and right sides or strokes are trailing edges. |

At hint generation 20, the font metrics and character hints are computed. Since no special information on the actual character contours, beyond the contours themselves, is required to perform these computations, any font may be accepted as input. Height thickness metrics are obtained either by examining images of specific individual characters or by averaging amongst several characters. Optionally, if these values are supplied externally, that is, the provider of the font provides these values, the external values may be used instead of the computed values. Edge positions are determined by looking for long vertical or horizontal portions of contours. Normal vectors are perpendicular to the contour, and are computed from contour equations and by determining which side of the contour is black and which side is white. For those points required for curve reconstruction, but which are not on the curve, the normals are calculated as if a normal vector extended from the curve through those points.

In the attached Appendix, the source code, in the MESA language of the Xerox Corporation, is provided demonstrating one possible embodiment of the source code to accomplish the described goals. The Mesa programming language operates on a microprocessor referred to as the Mesa microprocessor, which has been well documented, for example, in Xerox Development Environment, Mesa Language Manual, Copyright 1985 Xerox Corporation, Part No. 610E00170. This particular software is derived from the Typefounders product of the Xerox Corporation, Stamford, Conn. The Typefounders product accomplished all these character and font metrics, but did not provide them externally. (See Appendix, pages 67–319,for relevant Typefounder software modules called by software implementing the current invention including: CharacterOpsDefs.mesa, CharacterOpsImplA.mesa, CharacterOpsImplB.mesa, pages 67–105; ContourOpsDefs.mesa, ContourOpsImplA.mesa, ContourOpsImplB.mesa, ContourOpsImplC.mesa, ContourOpsImplD.mesa, pages 106–195; FontOpsDefs.mesa, FontOpsImpl.mesa, pages 196–221; ImageOpsDefs.mesa, ImageOpsImplA.mesa, ImageOpsImplB.mesa, pages 222–265 TypefounderUtilsdefs.mesa, TypefounderImplA.mesa, TypefounderImplB.mesa, pages 266–319) Additional software was added, which makes these values available for subsequent processing (See Appendix, page 1, TypeDefs.mesa for translation of the Typfounder data structure; page 36, MetricsDef.mesa, MetricsImpl.mesa, for measurement of font metrics; page 47, EdgeOpsDef. mesa, EdgeOpsImpl.mesa, for measurement of leading and trailing edge position) and performs the perpendiculars calculations (see, Appendix, page 56, NormalOpsdefs.mesa, NormalOpsImpl.mesa). This information is used for creation of a data structure for "hints" (see, Appendix, page 13, ICFFontIODefs. Mesa for creation of hint format for next steps). Of course, while in the Appendix, the various coded algorithms operating on the contour font data for the hint creation step 20 are given in the Mesa language, implementation is easily made in the Unix-based "C" language. The remainder of the system, and the algorithms incorporated will be described in the Appendix in the Unix-based "C" language.

Selecting a contour font for use enables a program that looks for font data, and designates its final position in an output, while calling the various programs forming the steps that will be described further hereinbelow (see, Appendix, page 320, raster.c). The contour font rasterization program herein described is useful on a variety of hardware platforms, attributes of which can be selected for enhanced operation of the system, such as for example, a greater degree of precision in the calculations (the difference between 8 bit calculation and 32 bit calculation). (see, Appendix, page 340, std.h)

Figure 2B:
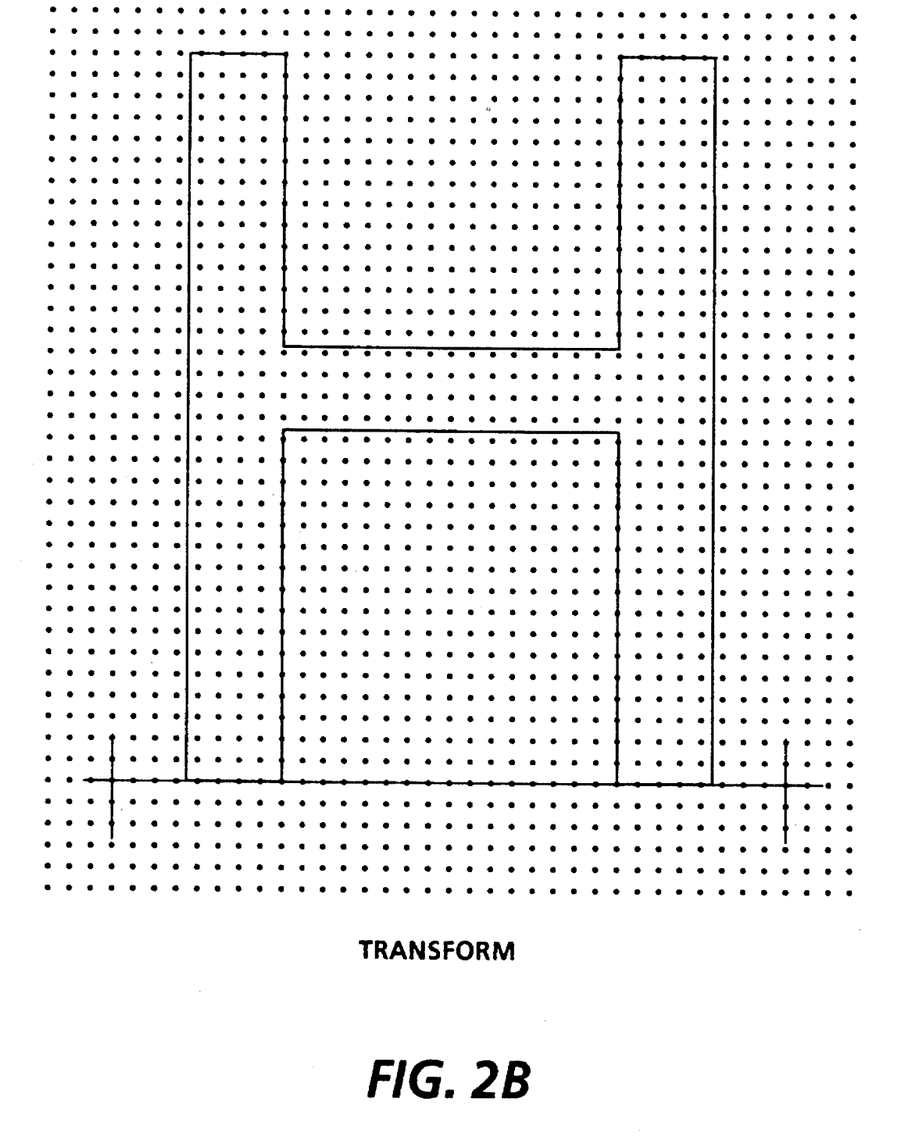

At transform step 30, (see, Appendix, page 343, xform.c) the contour font is converted from arbitrary contour font units, which are supplied by the provider of the font, to a particular size, expressed in units of pixels. Typically, contour font units are provided in terms of the contour itself, i.e., the height or size of the contour font is one (1). That is, lengths of characters are placed in terms of the size of the font character itself. These values must be transformed into pixel unit values, or whatever other value is required, e.g. the scaled font may be 30 pixels tall. Additionally, it is at this point that the contour font is rotated for either landscape or portrait mode printing, as required. Rotation and scaling is accomplished in accordance with a previously determined transformation matrix equation 35, which mathematically determines the conversion of the contour font from font measurements to pixel values at a selected orientation which can be used by the printer. The transformed character H is shown at FIG. 2B.

Subsequent to transformation step 30, at thickening or thinning step 40, font characters are thickened or thinned based on requirements of the transformation, and requirements of the printing process. The character contour is adjusted to make the strokes thicker or thinner to compensate for the xerographic or other marking process to follow. There are three components of the thickening or thinning value. The first compensates for xerographic or other imaging effects. That is, if for example, the marking technology will thin strokes by half a pixel, then strokes are thickened by half a pixel in this step. The amount of thickening or thinning specified in the printer profile 50 separately for X and Y directions, and is created at the manufacturer of the printer, and inserted at the printer profile 50. (see, Appendix, page 348, thicken.c)

The second component of thickening, called residual thickening, is applied to insure uniformity of output strokes after the sampling or rasterization step. This amount for horizontal thickening on upper case letters, for example, is equal to the difference between the calculated ideal output vertical stem thickness, which is obtained by scaling the font metric to the proper size, and the result of rounding that thickness off to the actual pixel width which will be obtained after rasterization. This rounding is performed to the nearest whole pixel if half bitting is not enabled and to the nearest half pixel, if half bitting is enabled. There are separate values for horizontal or vertical directions and for upper case, lower case and auxiliary characters.

The third component of thickening and thinning applies only to very small characters, and prevents drop-outs of fine lines. This amount is equal to the difference between the calculated scaled thickness of the hairlines, after thickening by the font thickening steps, and the minimum stroke thickness specified in the printer profile. When applied, this thickening brings fine lines up to the value of the minimum stroke thickness. The value is zero if the hairline is already greater than the minimum stroke thickness. (This process, referred to as "adaptive thickening," is not disclosed in the source code in the Appendix.)

Figure 2C:
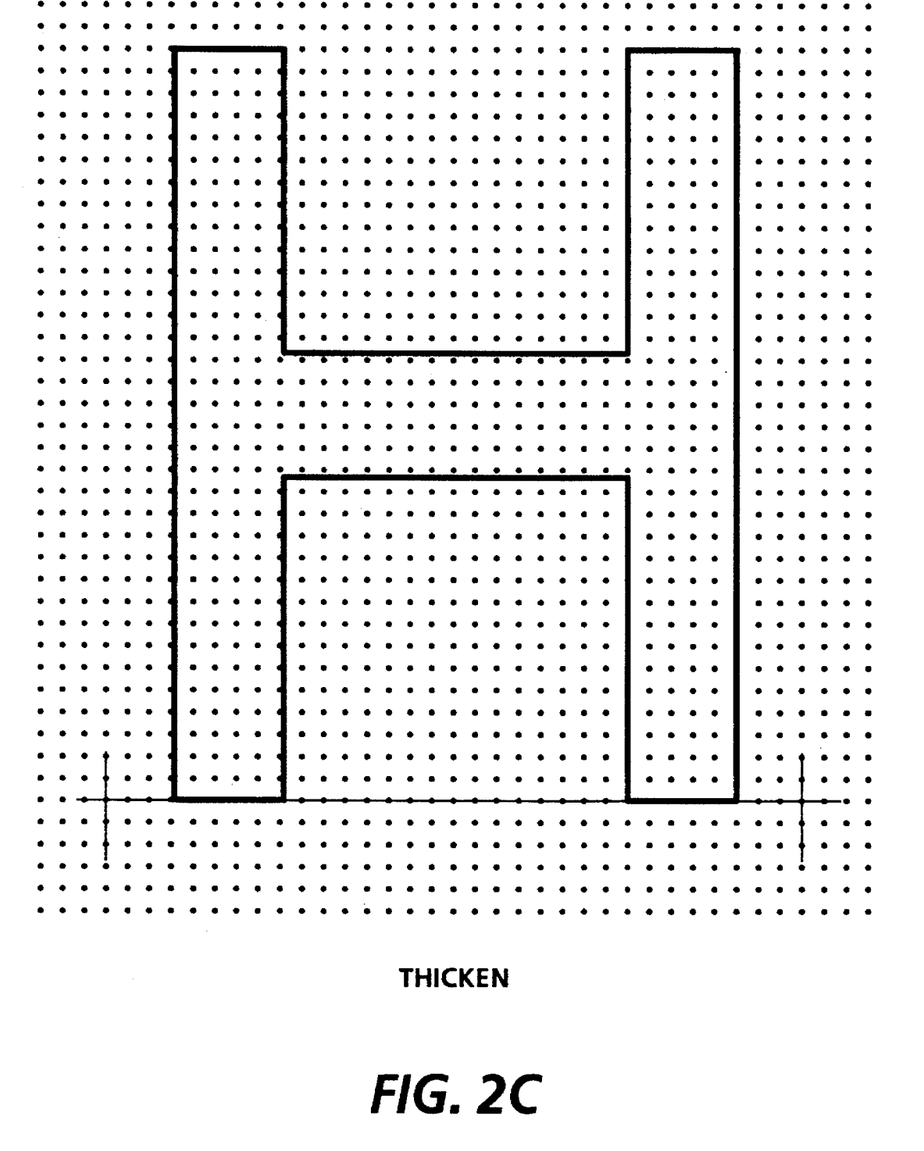

The actual thickening or thinning applied is equal to the sum of these three components. Each component has an independent value in the X and Y directions. The direction to move each contour control point is specified by its normal vector. The thickened character H is shown at FIG. C.

At step 60, the snap function or grid alignment function is applied. The coordinate system of the character is varied in the horizontal direction to move vertical and horizontal edges to positions where pixel boundaries will be after rasterization, i.e., to a whole pixel position. This is to assure uniform stroke thickness in the rasterized character images. The process is to piecewise stretch or shrink the character to force edges to align the pixel boundaries. On the left hand sides of the characters, the left edge of each stroke is moved to the closest pixel boundary, while the right edge of the stroke is moved to the pixel boundary specified by rounding the stroke thickness. This process gives priority to maintaining uniform stroke thickness over absolute stroke position. That is to say, that after the left edge of the character has been moved to a whole pixel position, the thickness of the stroke, or portion of the character, is examined to determine its thickness. The thickness has already been adjusted in the thickness of thinning step, so that it is close to a whole pixel width. Accordingly, the right edge of the character is then moved to the nearest whole pixel, based on rounding the thickness of the pixel, as opposed to moving the right hand side to the nearest pixel. On the right hand sides of characters, the rolls of left and right edges of strokes are reversed. Right edges of strokes are anchored, while left edges are rounded relatively to corresponding right edges. (see, Appendix, page 355, snap.c).

In one variant of this scheme, the positions of left and right index points or width points, which are those points which determine character spacing and are made to coincide in constructing words, are snapped before the vertical edges.

In the vertical direction, snapping is performed to piecewise stretch characters so that positions of baseline, cap-height, x-height, and descender fall on pixel boundaries. Baseline and descender position are treated as bottoms of strokes, that is, anchored, while cap-height and x-height are treated as tops of strokes, computed relative to the baseline. All characters are snapped to all of these positions, ensuring uniform character alignment. After these font metric positions are snapped, horizontal edges are snapped in the same manner as vertical edges, with lower edges of strokes anchored and upper edges snapped relative to the lower edges in the lower half of the character and upper edges of strokes anchored and lower edges snapped relative to the upper edges in the upper half of the character.

Figure 2D:
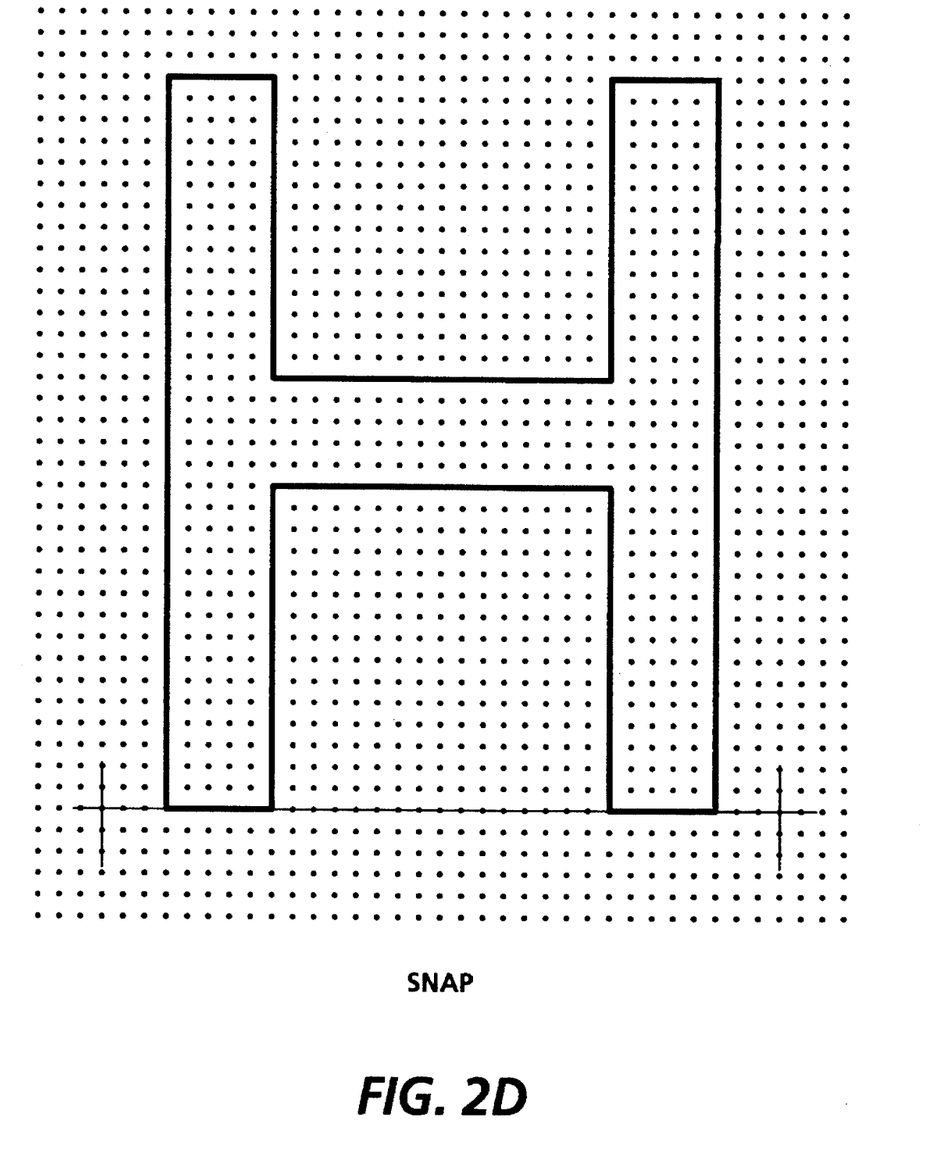
Figure 2E:
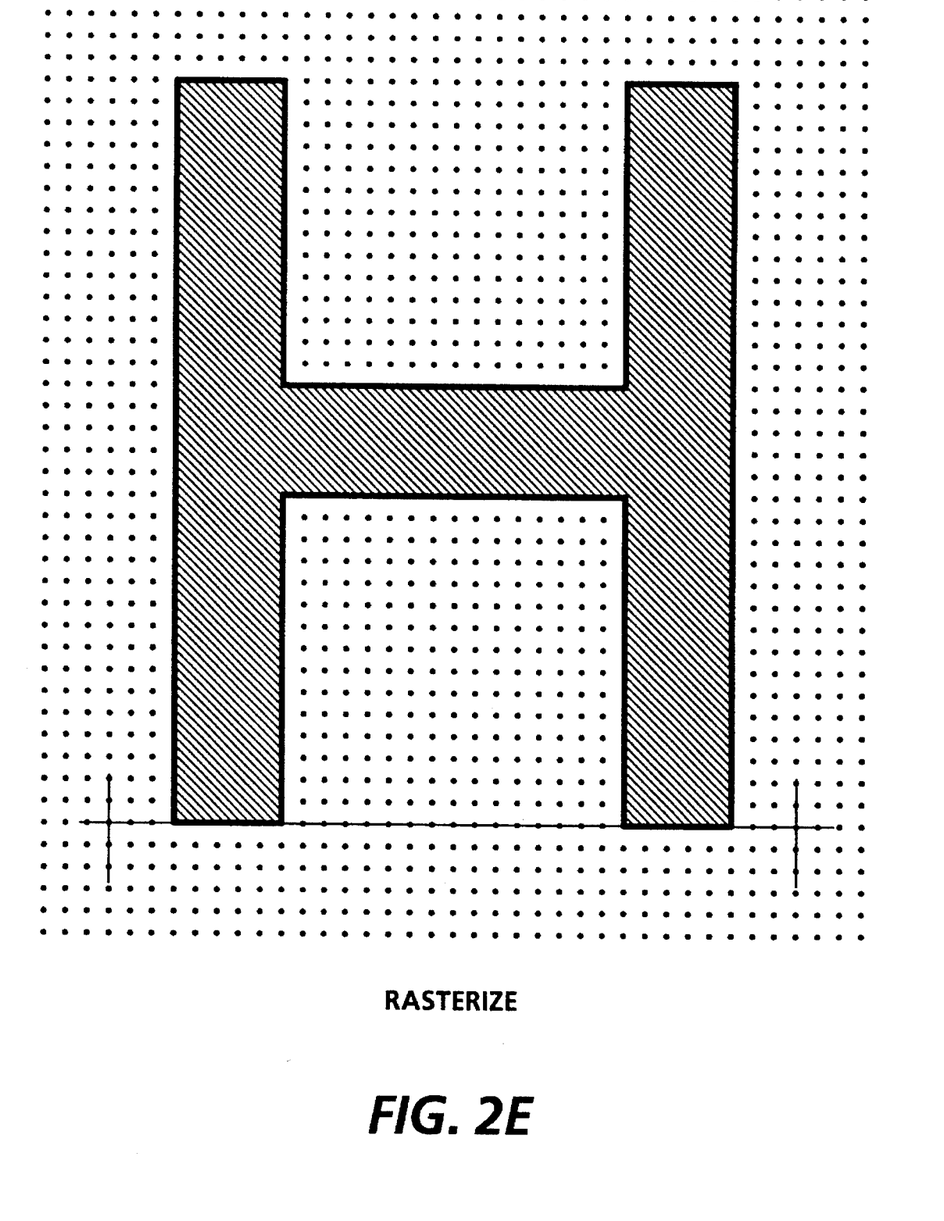

In both horizontal and vertical directions, snapping is performed one edge at a time. That is, the first edge is snapped, stretching the coordinate system of the character slightly on one side of the snapped edge and shrinking it slightly on the other side. The second edge is then snapped, with its pre-snapping position perhaps already modified slightly by the first snap. This sequential snapping helps preserve local character features better than simultaneous snapping of all edges does. When the second edge is snapped, its area of influence on the coordinate grid extends only up to the first snapped edge, which stays in place. This process is then repeated for the remainder of the edges. The snapped character H is shown at FIG. 2D.

Once each character in the adjusted contour font has been placed in the grid and appropriately thickened and thinned, the final step is to sample the adjusted contour on discrete grid. This step 70 can optionally produce half bitted output images, as controlled by the printer profile. Light half bitting produces half bitting on curves and diagonals, while heavy half bitting will also produce half bitted vertical and horizontal edges.

Rasterization in a preferred embodiment of this invention is in accordance with the process described in U.S. patent application Ser. No. 07/416,211 by S. Marshall, entitled "Rapid Halfbitting Stepper", and assigned to the present assignee of the present invention. This application is incorporated by reference herein for the purposes of teaching rasterization. (see, Appendix, page 364, step.c and page 368, step.h for rasterization with halfbitting; page 372, bezline.c for stepping around curve; page 396, fill.c for filling). The rasterized character is shown at FIG. 2D.

It will not doubt be appreciated that numerous changes and modifications are likely to occur to those skilled in the art, and it is intended in the appended claims to cover all those changes and modifications which fall within the spirit and scope of the present invention.

We claim:

1. A printer processor implemented method for producing a raster font from a contour font defined by a list of points connected by curves, said raster font suitable for printing on a selected printer having known reproduction characteristics, including the steps of:

a) deriving for a contour font a set of font metrics and character metrics of a character in the font defined in terms of arbitrary font units;

b) scaling a character contour defined in arbitrary font units to a selected size in units of pixels;

c) altering thickness of character strokes by adjusting vertical and horizontal coordinates of each point defining the character contour in directions defined by a vector normal to the character contour at each point, by an amount required to obtain a desired thickness from the measured font metrics and character metrics, and an amount required to add to difference thickness thereto in accordance with the selected printer reproduction characteristics, said alteration amounts together causing the vertical and horizontal strokes to be sufficiently close to an integer number of pixels or half pixels so as to cause subsequent numerical rounding to produce uniform results across the font;

d) grid aligning the contour of each character so that leading and trailing edges, and top and bottom edges of the contour of each character fall on whole or half pixel positions; and e) applying a rasterization function to the contour to convert each contour font character to a bitmap.

2. The method as defined in claim 1 wherein in said grid alignment step, after aligning said leading and top edges of said contours of each character on a whole pixel position, the length of any lines joining leading and trailing edges, and lines joining top and bottom edges, are rounded to an integer number of whole or half pixels, and the trailing edge and bottom edges are aligned at whole pixel positions.

3. In a printing system for printing on a selected printer having reproduction characteristics known and available as contour font correction data, wherein a font to be printed has a set of predefined font metrics and character metrics for each character in the font defined in terms of arbitrary font units, the method of preparing a contour font defined by a list of points connected by curves, for printing on the selected printer including the ordered steps of:

a) scaling each character in the contour font to a selected print resolution in pixels per unit length;

b) altering thickness of character strokes by adjusting vertical and horizontal coordinates of each point defining the contour of each character to a desired thickness in directions defined by a vector, normal to the character contour at each point, by an amount required to obtain a desired thickness from the measured font metrics and character metrics, and an amount required to add a difference thickness thereto in accordance with the contour font correction data for a particular printer, to cause the vertical and horizontal stroke thickness to approximate an integer number of pixels so as to cause subsequent numerical rounding to produce uniform results across the font;

c) grid aligning the contour of each character so that leading and trailing edges, and top and bottom edges of the contour of each character fall on whole pixel positions; and d) applying a rasterization function to the contour convert each contour font character to a bitmap.

4. The method as defined in claim 3 wherein in said grid alignment step, after aligning said leading and top edges of said contours of each character on a whole pixel position, the length of any lines joining leading and trailing edges, and lines joining top and bottom edges, are rounded to an integer number of pixels or half pixels, and the trailing edge and bottom edges are aligned at whole pixel positions.

* * * * *